United States Patent
Meyers et al.

(10) Patent No.: US 7,889,114 B2
(45) Date of Patent: Feb. 15, 2011

(54) RADAR TARGET PROCESSING REDUCTION SYSTEMS AND METHODS USING COOPERATIVE SURVEILLANCE SOURCES

(75) Inventors: David W. Meyers, Brooklyn Park, MN (US); Christine Haissig, Chanhassen, MN (US); David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 294 days.

(21) Appl. No.: 12/113,369

(22) Filed: May 1, 2008

(65) Prior Publication Data

US 2009/0273504 A1 Nov. 5, 2009

(51) Int. Cl.
*G01S 13/00* (2006.01)
*G01S 13/74* (2006.01)

(52) U.S. Cl. .............................. 342/30; 342/29; 342/36; 342/42; 342/43

(58) Field of Classification Search ............. 342/29–32, 342/36, 42–50, 52, 63–65, 70–72, 94–97; 701/3–18
See application file for complete search history.

(56) References Cited

U.S. PATENT DOCUMENTS

| | | | | |
|---|---|---|---|---|
| 4,139,848 A * | 2/1979 | Maxwell, Jr. | ................. | 342/30 |
| 5,999,116 A * | 12/1999 | Evers | ........................... | 342/36 |
| 6,047,233 A * | 4/2000 | Salvatore et al. | ............ | 701/120 |
| 6,208,284 B1 * | 3/2001 | Woodell et al. | ............... | 342/30 |
| 6,211,811 B1 * | 4/2001 | Evers | ........................... | 342/36 |
| 6,252,525 B1 * | 6/2001 | Philiben | ..................... | 340/961 |
| 6,542,809 B2 * | 4/2003 | Hehls, III | ................... | 701/120 |
| 6,567,037 B1 * | 5/2003 | Fung et al. | .................... | 342/29 |
| 6,573,858 B1 * | 6/2003 | Fung et al. | .................... | 342/36 |
| 6,633,259 B1 * | 10/2003 | Smith et al. | .................. | 342/456 |
| 6,683,562 B2 * | 1/2004 | Stayton et al. | .............. | 342/182 |
| 6,911,936 B2 * | 6/2005 | Stayton et al. | .............. | 342/182 |
| 6,967,616 B2 * | 11/2005 | Etnyre | ......................... | 342/182 |
| 7,006,032 B2 * | 2/2006 | King et al. | ..................... | 342/29 |
| 7,123,192 B2 * | 10/2006 | Smith et al. | .................. | 342/455 |
| 7,248,219 B2 * | 7/2007 | Smith et al. | .................. | 342/456 |
| 7,420,501 B2 * | 9/2008 | Perl | ............................. | 342/30 |
| 7,423,590 B2 * | 9/2008 | Smith | ......................... | 342/450 |
| 7,437,245 B2 * | 10/2008 | Ybarra et al. | ............... | 701/301 |
| 7,474,251 B2 * | 1/2009 | Rowlan | ....................... | 342/29 |
| 7,492,307 B2 * | 2/2009 | Coulmeau | ..................... | 342/32 |

(Continued)

*Primary Examiner*—Thomas H Tarcza
*Assistant Examiner*—Peter Bythrow
(74) *Attorney, Agent, or Firm*—Black Lowe & Graham PLLC

(57) ABSTRACT

Systems and methods for reducing radar target processing. The systems include a processor configured to receive a first input from a cooperative surveillance source and a second input from a radar device. The first input includes cooperative target information, the second input includes cooperative and non-cooperative target information, and the processor is configured to process the first and second inputs to remove cooperative target information from the second input based on the first input to generate a modified radar output for use by an output device. The methods include receiving a first input including cooperative target information from a cooperative surveillance source, receiving a second input including cooperative and non-cooperative target information from a radar device, processing the first and second inputs to remove cooperative target information from the second input based on the first input, and generating a modified radar output based on the processed first and second inputs.

20 Claims, 6 Drawing Sheets

U.S. PATENT DOCUMENTS

| | | | |
|---|---|---|---|
| 7,495,601 B2 * | 2/2009 | Blaskovich et al. | 342/29 |
| 7,495,612 B2 * | 2/2009 | Smith | 342/450 |
| 7,525,474 B2 * | 4/2009 | Carocari et al. | 342/47 |
| 7,570,177 B2 * | 8/2009 | Reynolds et al. | 340/961 |
| 7,612,716 B2 * | 11/2009 | Smith et al. | 342/454 |
| 2002/0021247 A1 * | 2/2002 | Smith et al. | 342/450 |
| 2003/0025719 A1 * | 2/2003 | Palmer et al. | 345/700 |
| 2003/0097216 A1 * | 5/2003 | Etnyre | 701/120 |
| 2005/0007272 A1 * | 1/2005 | Smith et al. | 342/189 |
| 2006/0119515 A1 * | 6/2006 | Smith | 342/450 |
| 2007/0222664 A1 * | 9/2007 | Perl | 342/29 |
| 2008/0150784 A1 * | 6/2008 | Zhang et al. | 342/30 |
| 2009/0273504 A1 * | 11/2009 | Meyers et al. | 342/42 |
| 2010/0039310 A1 * | 2/2010 | Smith et al. | 342/29 |

* cited by examiner

RADAR TARGET PROCESSING REDUCTION SYSTEMS AND METHODS USING COOPERATIVE SURVEILLANCE SOURCES

BACKGROUND OF THE INVENTION

For unmanned aircraft (UA) to operate effectively, they need the ability to see and avoid other aircraft in the same way that manned aircraft do. One of the challenges to avoiding other aircraft without an on-board pilot is having the ability to see them electronically. Aircraft equipped with a cooperative surveillance source such as an operational transponder device are referred to as cooperative targets and can be seen electronically by interrogating the cooperative surveillance source. Aircraft that are not equipped with a cooperative surveillance source are referred to as non-cooperative targets. Non-cooperative targets must be seen with a non-cooperative surveillance method.

Radar is one non-cooperative surveillance method. Challenges with using radar to track aircraft include significant and expensive processing requirements, which scale with the number of targets that must be tracked. Radar systems typically track both non-cooperative and cooperative targets, which increases the processing requirements as compared to tracking solely non-cooperative targets.

SUMMARY OF THE INVENTION

The present invention provides systems and methods for tracking cooperative and non-cooperative targets. In an example, the systems include a processor configured to receive a first input from one or more cooperative surveillance sources and a second input from a radar device. The cooperative surveillance sources may include a transponder that generates an altitude-encoded transponder reply, an Automatic Dependent Surveillance-Broadcast (ADS-B) message, or a Traffic Information Services Broadcast message for example. The cooperative surveillance sources may also include other types of cooperative surveillance sources. The first input includes cooperative target information, the second input includes cooperative target information and non-cooperative target information, and the processor is configured to process the first and second inputs to remove cooperative target information from the second input based on the first input to generate a modified radar output for use by an output device.

In accordance with additional aspects of the invention, the systems include a cooperative target post processor for processing signals received from one or more cooperative surveillance sources to generate cooperative target tracking information, a radar target post processor for generating non-cooperative target tracking information based on reflected radar signals received using a radar device, a combined track file generated using the cooperative target tracking information and the non-cooperative target tracking information, and a radar target selection processor configured to selectively remove cooperative targets using the combined track file from information received from the radar device that includes both cooperative and non-cooperative target information such that only non-cooperative target information is passed to the radar target post processor from the radar target selection processor.

In accordance with further aspects of the invention, the processor is further configured to track targets based on the modified radar output.

In accordance with other aspects of the invention, the first input includes a three-dimensional position of the target that may include an absolute position of the target or a relative position to the target, for example. The second input includes range, azimuth, and elevation information.

In accordance with still further aspects of the invention, the cooperative surveillance source is an altitude-encoding transponder and the radar device is a millimeter-wave (MMW) radar system.

In accordance with still further aspects of the invention, the methods include receiving a first input including cooperative target information from a cooperative surveillance source, receiving a second input including cooperative target information and non-cooperative target information from a radar device, processing the first and second inputs to remove cooperative target information from the second input based on the first input, and generating a modified radar output based on the processed first and second inputs.

In accordance with yet another aspect of the invention, the methods include tracking at least one target based on the modified radar output.

In accordance with further aspects of the invention, the methods include combining the modified radar output with the cooperative target information to create a combined track file that includes both non-cooperative and cooperative targets.

In accordance with further aspects of the invention, the methods include using the combined track file to drive a display, be an input to another processor such as a collision avoidance processor or be datalinked to an aircraft or ground site.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
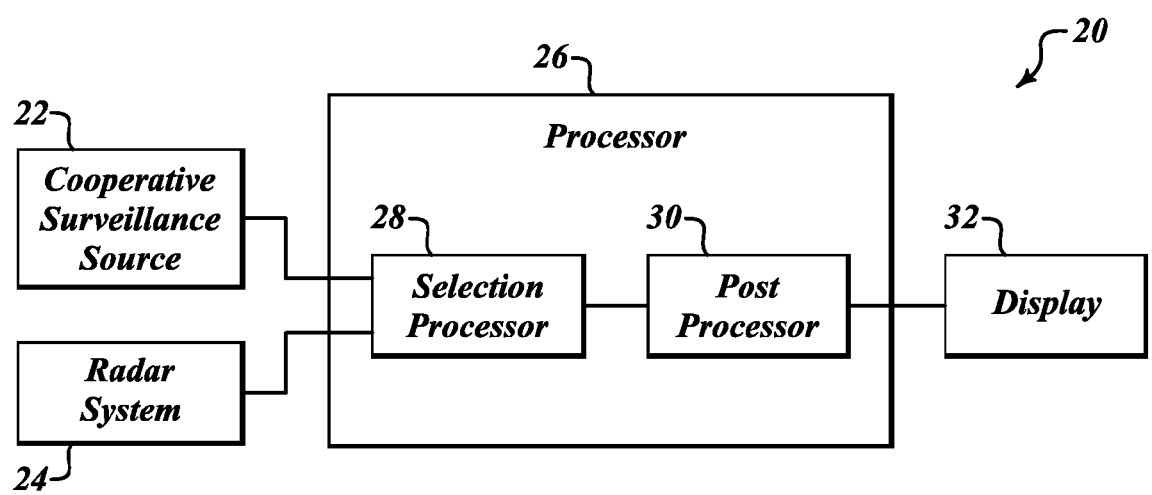
FIG. 1 is a block diagram of a radar target processing reduction system using cooperative surveillance formed in accordance with an example of the invention.

FIG. 1 is a block diagram of a radar target processing reduction system 20 using cooperative surveillance formed in accordance with an example of the invention. The system 20 includes a cooperative surveillance source 22, such as a transponder, and a radar system 24. The cooperative surveillance source 22 and the radar system 24 are in signal communication with a processor 26. In an example, the cooperative surveillance source 22 is a Mode-S transponder and the radar system 24 is a millimeter-wave (MMW) radar system. The processor 26 includes a selection processor 28 and a post processor 30. An output of the cooperative surveillance source 22 is used as a first input to the selection processor 28. Although not shown, it should be understood that additional components such as an antenna and a receiver may be included between the cooperative surveillance source 22 and the selection processor 28. An output of the radar system 24 is used as a second input to the selection processor 28. A display 32 is in signal communication with the post processor 30. Although the display 32 is used as an output device in this example, in other examples other output devices may be used.

The output of the cooperative surveillance source 22 includes cooperative target information and the output of the radar system 24 includes combined cooperative and non-cooperative target information. In an example, the first input includes a three-dimensional position of the target that may include an absolute position of the target or a relative position to the target and the second input includes range, azimuth, and elevation information. However, in other examples, other target information may be used for the first and second inputs. The selection processor 28 processes the first and second inputs to remove at least some of the cooperative target information from the second input based on the first input to generate a modified radar output that is used by the post processor 30. The post processor 30 tracks targets based on the modified radar output and generates tracking information that is displayed on the display 32. In an example, the selection processor 28 removes all of the cooperative target information from the second input so that the post processor 30 will track only non-cooperative targets. In an example, the non-cooperative targets include UAs. However, in other examples, the non-cooperative targets may be other types of vehicles.

Generally, the cooperative surveillance source 22 replies include a location of cooperative targets in a three-dimensional coordinate system having a first reference frame and the radar system 24 provides a location of cooperative and non-cooperative targets in a three-dimensional coordinate system that may have a second reference frame that differs from the first reference frame of the cooperative surveillance source 22. The selection processor 28 transforms the locations of the cooperative surveillance source 22 targets and the radar system 24 targets to a common three-dimensional coordinate system having the same reference frame. The common three-dimensional coordinate system may be a geographic earth-centered spherical coordinate system, a rectangular earth-centered earth-fixed coordinate system, or an aircraft-centered system, for example. Information from a navigation system or other aircraft systems (not shown) of an aircraft hosting the system 20 may also be used in transforming coordinates of the cooperative and non-cooperative targets in some examples.

If coordinates of cooperative targets from the cooperative surveillance source 22 are determined to be within a threshold distance from the coordinates of targets from the radar system 24, they are determined to be the same target. The threshold distance may be a predetermined fixed distance or calculated from parameters that may include the time of applicability of the radar measurement, time of applicability of the cooperative targets, the speed of the aircraft, the speed of the target, accuracy or other characteristics of the cooperative surveillance source 22, and the accuracy or other characteristics of the radar system 24. The selection processor 28 then removes these targets from output of the radar system 24 that is communicated to the post processor 30.

Figure 2:
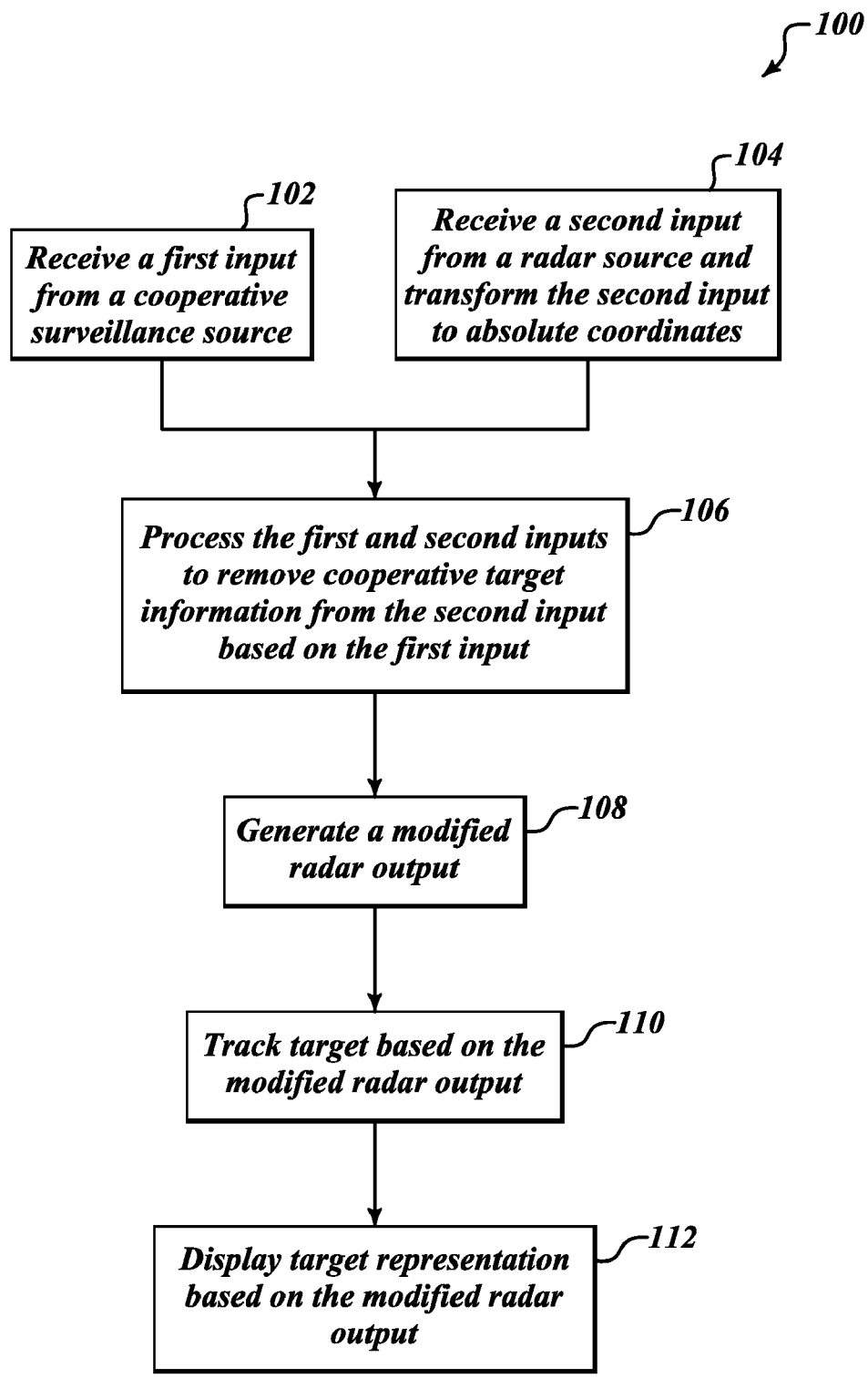
FIG. 2 is a flowchart of a radar target reduction processing method using the system shown in FIG. 1 in accordance with an example of the invention.

FIG. 2 is a flowchart of a radar target processing reduction method 100 using the system 20 shown in FIG. 1 in accordance with an example of the invention. First, at a block 102, the processor 26 receives a first input including cooperative target information from the cooperative surveillance source 22. Concurrently with the step at the block 102, at a block 104, the processor 26 receives a second input including combined cooperative target information and non-cooperative target information from the radar system 24. In an example embodiment, the processor 26 receives the second input from the radar system 24 in relative coordinates and transforms them to absolute coordinates at the block 104. The relative coordinates may include azimuth, elevation, and range and the absolute coordinates may include latitude, longitude, and altitude, for example. In this example, the first and second inputs are received concurrently at the blocks 102 and 104. However, in other examples, the first and second inputs may be received in another manner such as sequentially or in an alternating fashion.

Next, at a block 106, the selection processor 28 processes the first and second inputs to remove at least some of the cooperative target information from the second input based on the first input. Next, at a block 108, the selection processor 28 generates a modified radar output based on the processed first and second inputs. Then, at a block 110, the post processor 30 tracks targets based on the modified radar output. In an example, the selection processor 28 processes the first and second inputs at the block 106 to remove all of the cooperative target information from the second input and the post processor 30 tracks only non-cooperative targets at the block 110. Next, at a block 112, the display 32 displays representations of targets based on the modified radar output.

Figure 3:
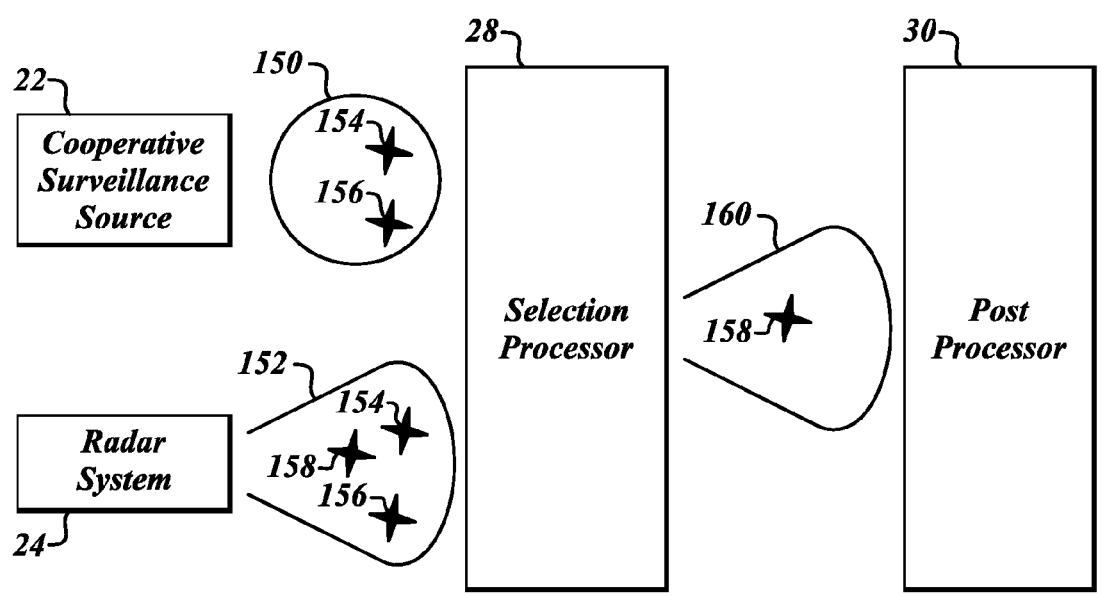
FIG. 3 is an example of targets detected at different stages of the system shown in FIG. 1 in accordance with an example of the invention.

FIG. 3 is an example of targets detected at different stages of the system 20 shown in FIG. 1 in accordance with an example of the invention. A transponder coverage area 150 and a radar coverage area 152 are shown. Although transponder coverage areas are typically three-dimensional with a shape depending on transponder antenna locations and receiver configuration, the transponder coverage area 150 is shown as a circle for clarity. For similar reasons, the radar coverage area 152 is shown as a two dimensional shape rather than the typical conical radar coverage area. Transponders and radar can have different detection ranges and detection volumes. For clarity, the transponder coverage area 150 and the radar coverage area 152 are shown detecting targets at similar ranges.

The transponder coverage area 150 is shown to include a first cooperative target 154 and a second cooperative target 156. The radar coverage area 152 includes the first and second cooperative targets 154, 156 as well as a non-cooperative target 158. In an example embodiment, the selection processor 28 transforms information received from the cooperative surveillance source 22 and the radar system 24 to a common reference frame. In an example, the cooperative surveillance source 22 provides information in absolute coordinates and the radar system 24 provides information in relative coordinates. The selection processor 28 transforms the relative coordinates from the radar system 24 to absolute coordinates before conducting further processing. The relative coordinates may include azimuth, elevation, and range and the absolute coordinates may include latitude, longitude, and altitude, for example. In other embodiments, the transformation process may be performed in other components, the radar system 24 may provide information in absolute coordinates, or different coordinate systems may be used. After the information has been transformed to a common coordinate system, the selection processor 28 removes representations of the cooperative targets 154, 156 from the radar system 24 output so that only a representation of the non-cooperative target 158 remains in a modified radar output 160. Then, the post processor 30 can track only the non-cooperative target 158. In an example, focusing precisely on non-cooperative targets significantly reduces the amount of processing necessary for tagging and tracking of radar targets.

Figure 4:
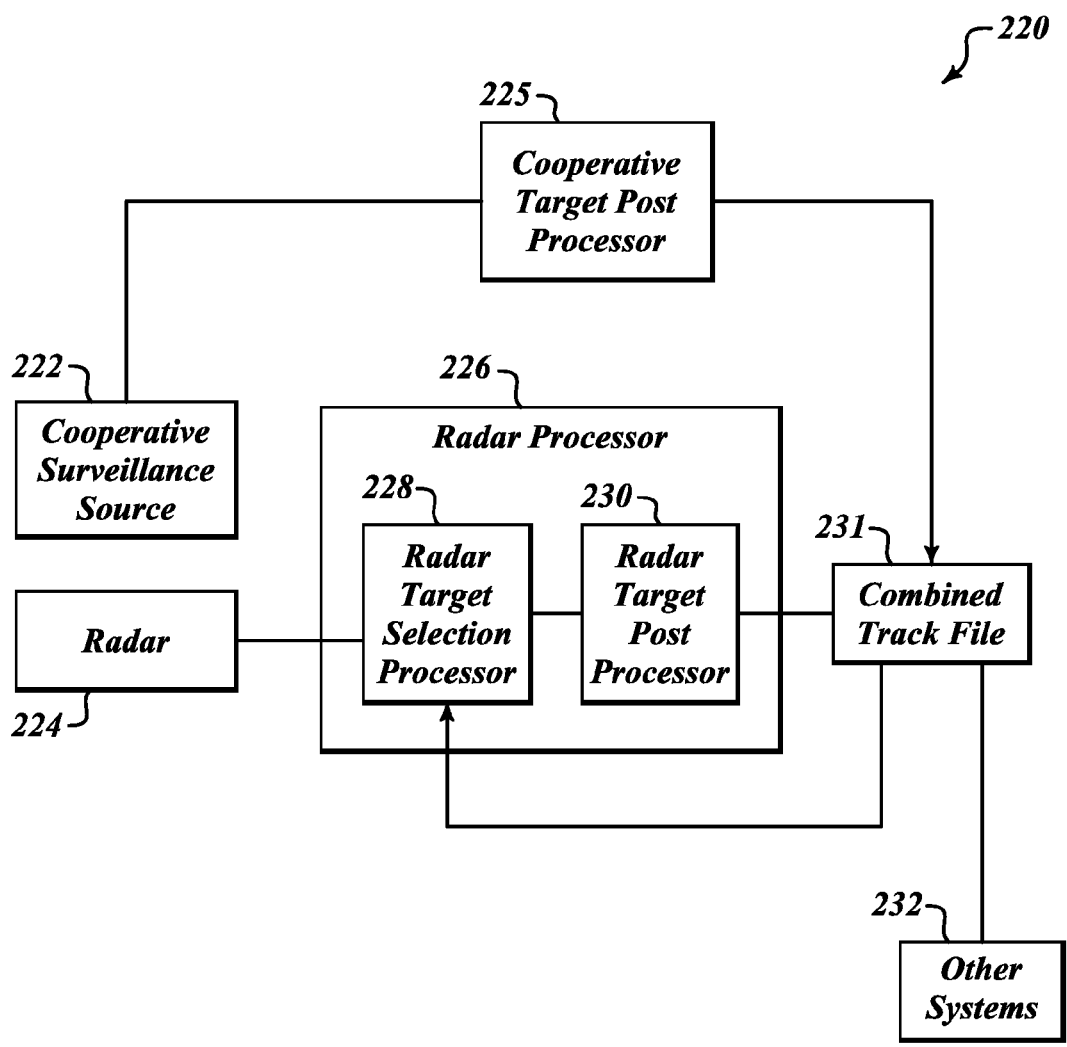
FIG. 4 is a block diagram of a radar target processing reduction system using cooperative surveillance formed in accordance with an additional example of the invention.

FIG. 4 is a block diagram of a radar target processing reduction system 220 using cooperative surveillance formed in accordance with an additional example of the invention. The system 220 includes a cooperative surveillance source 222 and a radar device 224. The cooperative surveillance source 222 is in signal communication with a cooperative target post processor 225. Although not shown, it should be understood that additional components such as an antenna and a receiver may be included between the cooperative surveillance source 222 and the cooperative target post processor 225. The cooperative target post processor 225 generates cooperative target tracking information based on signals received from the cooperative surveillance source 222. The cooperative target tracking information may be stored in a cooperative target tracking file (not shown) in a memory unit (not shown). The radar device 224 is in signal communication with a radar processor 226. In an example, the cooperative surveillance source 222 is a Mode-S transponder and the radar device 224 is a millimeter-wave (MMW) radar system. The radar processor 226 includes a radar target selection processor 228 and a radar target post processor 230.

A combined track file 231 that may be stored in a memory unit (not shown) receives information from the radar target post processor 230 and the cooperative target post processor 225. The combined track file 231 is used as a first input to the radar target selection processor 228. An output of the radar device 224 is used as a second input to the radar target selection processor 228. One or more other systems 232 are in signal communication with the combined track file 231. The other systems 232 may include a display, another processor such as a collision avoidance processor, systems onboard another aircraft, or systems at a ground site, for example. Although the other systems 232 are in signal communication with the combined track file 231 in this example, in other examples, the other systems 232 may be in signal communication with the radar target post processor 230 such that they receive only non-cooperative target information, or one or more output devices such as a display may be included within a radar device that includes the radar processor 226.

The output of the cooperative target post processor 225 received by the combined track file 231 includes cooperative target information and the output of the radar device 224 includes combined cooperative and non-cooperative target information. The combined track file 231 serves as a first input to the radar target selection processor 228 and the output of the radar device 224 serves as a second input to the radar target selection processor 228. In an example, the cooperative target information from the cooperative target post processor 225 includes a three-dimensional position of the target that may include an absolute position of the target or a relative position to the target. This information is stored in the combined track file 231 as a part of the first input. The second input includes range, azimuth, and elevation information. However, in other examples, other target information may be used for the first and second inputs.

The radar target selection processor 228 processes the first and second inputs to remove at least some of the cooperative target information from the second input based on the first input to generate a modified radar output that is used by the radar target post processor 230. The radar target post processor 230 tracks targets based on the modified radar output and generates tracking information that is communicated to the combined track file 231. In an example, the radar target selection processor 228 removes all of the cooperative target information from the second input so that the radar target post processor 230 will track only non-cooperative targets. In an example, the non-cooperative targets include UAs. However, in other examples, the non-cooperative targets may be other types of vehicles.

Generally, the cooperative surveillance source 222 replies include a location of cooperative targets in a three-dimensional coordinate system and the radar device 224 provides a location of cooperative and non-cooperative targets in a three-dimensional coordinate system that may have a reference frame that differs from the reference frame of the cooperative surveillance source 222. The radar target selection processor 228 transforms the locations of the cooperative surveillance source 222 and the radar device 224 targets to a common three-dimensional coordinate system. Although the radar target selection processor 228 is described as receiving and transforming locations of targets from the cooperative surveillance source 222, it should be understood that the radar target selection processor 228 is receiving such location information after it has passed through and possibly been transformed by the cooperative target post processor 225 and the combined track file 231. The common three-dimensional coordinate system may be a geographic earth-centered spherical coordinate system, a rectangular earth-centered earth-fixed coordinate system, or an aircraft-centered system, for example. Information from a navigation system or other aircraft systems (not shown) of an aircraft hosting the system 220 may also be used in transforming coordinates of the cooperative and non-cooperative targets in some examples.

In an example embodiment, the radar target selection processor 228 transforms information received from the cooperative surveillance source 222 and the radar system 224 to a common reference frame. In an example, the cooperative surveillance source 222 provides information in absolute coordinates and the radar system 224 provides information in relative coordinates. The radar target selection processor 228 transforms the relative coordinates from the radar system 224 to absolute coordinates before conducting further processing. The relative coordinates may include azimuth, elevation, and range and the absolute coordinates may include latitude, longitude, and altitude, for example. In other embodiments, the transformation process may be performed by other components within the radar processor 226 or by other components not shown, the radar system 224 may provide information in absolute coordinates, or different coordinate systems may be used.

If coordinates of cooperative targets from the cooperative surveillance source 222 are determined to be within a threshold distance from the coordinates of targets from the radar system 224, they are determined to be the same target. The threshold distance may be a predetermined fixed distance or calculated from parameters that may include the time of applicability of the radar measurement, time of applicability of the cooperative targets, the speed of the aircraft, the speed of the target, accuracy or other characteristics of the cooperative surveillance source 222, and the accuracy or other characteristics of the radar device 224. The radar target selection processor 228 then removes these targets from output of the radar system 224 that is communicated to the radar target post processor 230.

Figure 5:
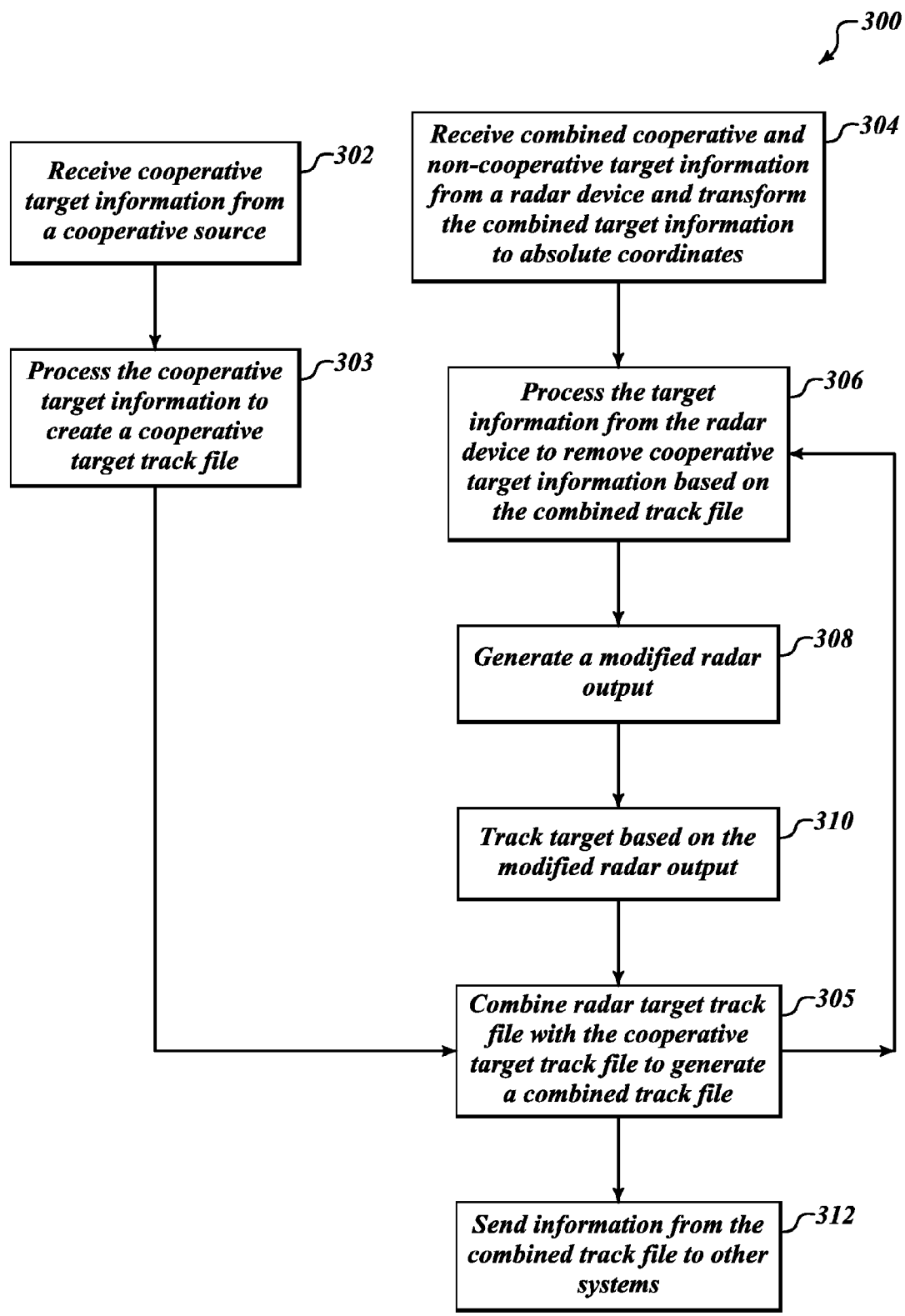
FIG. 5 is a flowchart of a radar target processing reduction method using the system shown in FIG. 4 in accordance with an example of the invention.

FIG. 5 is a flowchart of a radar target processing reduction method 300 using the system 220 shown in FIG. 4 in accordance with an example of the invention. First, at a block 302, cooperative target information from the cooperative surveillance source 222 is received by the cooperative target post processor 225. Then, at a block 303, the cooperative target information is processed by the cooperative target post processor 225 to generate cooperative target tracking information. Concurrently with the step at the block 302, at a block 304, the processor 226 receives combined cooperative target information and non-cooperative target information from the radar device 224. In an example embodiment, the processor 226 receives the second input from the radar device 224 in relative coordinates and transforms them to absolute coordinates at the block 304. The relative coordinates may include azimuth, elevation, and range and the absolute coordinates may include latitude, longitude, and altitude, for example. In this example, the information from the cooperative surveillance source 222 and the radar device 224 is received concurrently at the blocks 302 and 304. However, in other examples, the information from the cooperative surveillance source and the radar device 224 may be received in another manner such as sequentially or in an alternating fashion.

Next, at a block 305, the cooperative target tracking information from the cooperative target post processor 225 is used to generate the combined track file 231. The combined track file 231 serves as a first input to the radar target selection processor 228 and the combined cooperative and non-cooperative target information from the radar device 224 serves as a second input to the radar target selection processor 228. Then, at a block 306, the radar target selection processor 228 processes the second input to remove at least some of the cooperative target information from the second input based on information contained in the first input. Next, at a block 308, the radar target selection processor 228 generates a modified radar output based on the processed second input. Then, at a block 310, the radar target post processor 230 tracks targets based on the modified radar output. In an example, the radar target selection processor 228 processes the second input and the first input at the block 306 to remove all of the cooperative target information from the second input and the radar target post processor 230 tracks only non-cooperative targets at the block 310. Next, the method 300 returns to the block 305 where the combined track file 231 is updated using information from both the cooperative target post processor 225 and the radar target post processor 230. Then, at a block 312, information from the combined track file 231 is communicated to one or more other systems 232.

Figure 6:
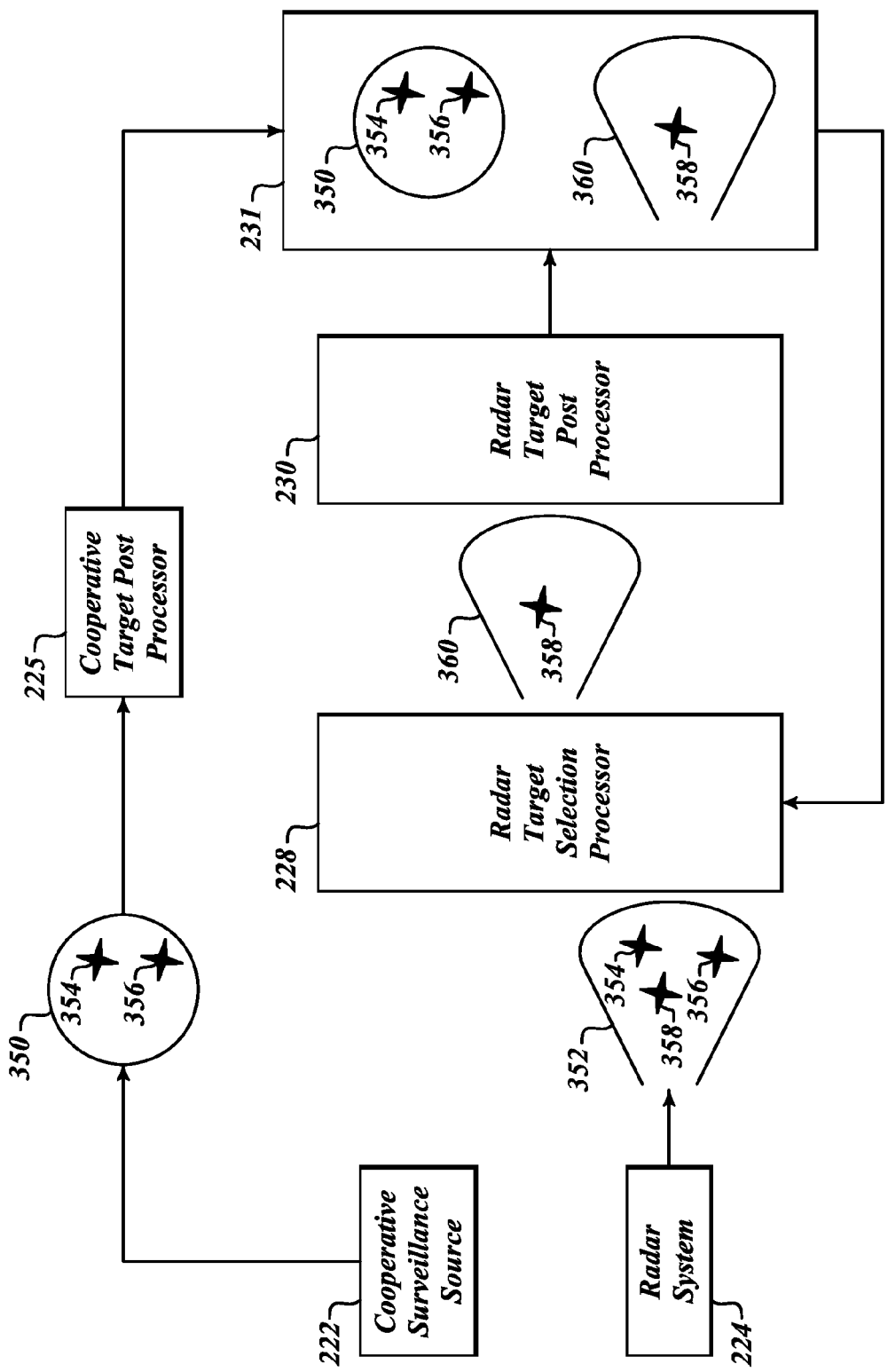
FIG. 6 is an example of targets detected at different stages of the system shown in FIG. 4 in accordance with an example of the invention.

FIG. 6 is an example of targets detected at different stages of the system 220 shown in FIG. 4 in accordance with an example of the invention. A transponder coverage area 350 and a radar coverage area 352 are shown. Although transponder coverage areas are typically three-dimensional with a shape depending on transponder antenna locations and receiver configuration, the transponder coverage area 350 is shown as a circle for clarity. For similar reasons, the radar coverage area 352 is shown as a two dimensional shape rather than the typical conical radar coverage area. Transponders and radar can have different detection ranges and detection volumes. For clarity, the transponder coverage area 350 and the radar coverage area 352 are shown detecting targets at similar ranges.

The transponder coverage area 350 is shown to include a first cooperative target 354 and a second cooperative target 356. The radar coverage area 352 includes the first and second cooperative targets 354, 356 as well as a non-cooperative target 358. The radar target selection processor 228 removes representations of the cooperative targets 354, 356 from the radar device 224 output so that only a representation of the non-cooperative target 358 remains in a modified radar output 360. Then, the radar target post processor 230 can track only the non-cooperative target 358. In an example, focusing precisely on non-cooperative targets significantly reduces the amount of processing necessary for tagging and tracking of radar targets.

Still referring to FIG. 6, information regarding targets in the transponder coverage area 350 is shown to originate from the cooperative surveillance source 222 and pass to the cooperative target post processor 225 before the information is communicated to the combined track file 231. In some examples, the target information communicated to the combined track file 231 from the cooperative target post processor 225 may be different than that received from the cooperative surveillance source 222 as a result of processing steps and/or transformations performed by the cooperative target post processor 225. Information regarding targets in the radar coverage area 352 is shown to originate from the radar device 224 before the information is communicated to the radar target selection processor 228. The radar target selection processor 228 also receives information from the combined track file 231 that includes information regarding targets in the transponder coverage area 350 as well as information regarding non-cooperative targets in the modified radar output 360. In some examples, the information regarding cooperative targets in the transponder coverage area 350 may be flagged with an associated identifier in the combined track file 231 to indicate that the information originated from a cooperative surveillance source. Information regarding only non-cooperative targets is shown in the modified radar output 360 that leaves the radar target selection processor 228 after processing the combined track file 231 and the information regarding targets in the radar coverage area 352. Although the modified radar coverage area 360 is identified and shown as being the same after leaving the radar target selection processor 228 and in the combined track file 231, it should be understood that the modified radar target information may be different in these two positions at any given point in time because the combined track file 231 is acting as feed-back to the radar target selection processor in a process that may vary with time as targets enter and leave the transponder coverage area 350 and the radar coverage area 352.

While the preferred embodiment of the invention has been illustrated and described, as noted above, many changes can be made without departing from the spirit and scope of the invention. For example, other types of cooperative surveillance sources and other types of radar devices than MMW may be used. The processor 26 or 226 may also be included as a part of the radar system 24 or 224 respectively in some embodiments. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A cooperative surveillance source based radar target processing reduction system comprising:

a processor configured to receive a first input from a cooperative surveillance source and a second input from a radar device; and an output device in signal communication with the processor, wherein the first input includes cooperative target information, the second input includes combined cooperative target information and non-cooperative target information, and wherein the processor is configured to process the first and second inputs to remove at least some of the cooperative target information from the second input based on the first input to generate a modified radar output for use by the output device.

2. The system of claim 1, wherein the output device is a display.

3. The system of claim 1, wherein the processor is further configured to track targets based on the modified radar output.

4. The system of claim 3, wherein the processor includes a selection processor configured to process the first and second inputs to remove at least some of the cooperative target information from the second input based on the first input to generate a modified radar output and wherein the processor includes a post processor configured to track targets based on the modified radar output.

5. The system of claim 1, wherein the processor is configured to remove all of the cooperative target information from the second input.

6. The system of claim 5, wherein the first input includes a three-dimensional position of the target in absolute coordinates, wherein the second input includes relative coordinates of range, azimuth, and elevation, and wherein the processor is configured to transform the second input from relative coordinates to absolute coordinates before conducting further processing.

7. The system of claim 1, wherein the first input includes at least one of a three-dimensional absolute position of the target or a three-dimensional relative position to the target.

8. The system of claim 1, further comprising:
a cooperative target post processor in signal communication with the cooperative surveillance source; and
a combined track file configured to receive information from the cooperative target post processor and the processor,
wherein the first input is the combined track file including information from the cooperative surveillance source.

9. The system of claim 1, wherein the first input is from a Mode-S transponder.

10. The system of claim 1, wherein the second input is from a millimeter-wave radar system.

11. A cooperative surveillance source based radar target processing reduction method comprising:
receiving a first input including cooperative target information from a cooperative surveillance source;
receiving a second input including combined cooperative target information and non-cooperative target information from a radar device;
processing the first and second inputs to remove at least some of the cooperative target information from the second input based on the first input; and
generating a modified radar output based on the processed first and second inputs.

12. The method of claim 11, further comprising displaying the modified radar output.

13. The method of claim 11, further comprising tracking at least one target based on the modified radar output.

14. The method of claim 13, wherein only non-cooperative targets are tracked.

15. The method of claim 11, wherein processing the first and second inputs includes removing all of the cooperative target information from the second input.

16. The method of claim 15, wherein the first input includes a three-dimensional position of the target in absolute coordinates, wherein the second input includes relative coordinates of range, azimuth, and elevation, and wherein processing includes transforming the second input from relative coordinates to absolute coordinates before conducting further processing.

17. The method of claim 11, wherein the first input includes at least one of a three-dimensional absolute position of the target and a three-dimensional relative position to the target.

18. The method of claim 11, wherein processing the first and second inputs includes processing information from the cooperative surveillance source at a cooperative target post processor, generating a combined track file using output from the cooperative target post processor, and processing the second input and the combined track file to remove at least some of the cooperative target information from the second input based on the combined track file.

19. The method of claim 11, wherein the first input is from a Mode-S transponder.

20. The method of claim 11, wherein the second input is from a millimeter-wave radar system.

* * * * *